(12) United States Patent
Kukucka et al.

(10) Patent No.: US 7,413,229 B2
(45) Date of Patent: Aug. 19, 2008

(54) HOLDER FOR AN ELECTRONIC DEVICE

(75) Inventors: Richard J Kukucka, Ann Arbor, MI (US); Brian M Chaloult, Rochester Hills, MI (US)

(73) Assignee: Chrysler LLC, Auburn Hills, MI (US)

( * ) Notice: Subject to any disclaimer, the term of this patent is extended or adjusted under 35 U.S.C. 154(b) by 205 days.

(21) Appl. No.: 11/333,905

(22) Filed: Jan. 18, 2006

(65) Prior Publication Data

US 2007/0176449 A1 Aug. 2, 2007

(51) Int. Cl.
*B60R 11/00* (2006.01)
(52) U.S. Cl. .................. 296/24.34; 296/37.8; 296/1.09; 297/188.16
(58) Field of Classification Search .............. 296/24.34, 296/37.8, 1.09; 297/115, 188.14–188.19, 297/411.21, 411.2, 411.33, 411.32; 224/275; 379/454
See application file for complete search history.

(56) References Cited

U.S. PATENT DOCUMENTS

| | | | |
|---|---|---|---|
| 5,524,050 A * | 6/1996 | Boerema et al. ............ 379/441 |
| 5,836,496 A * | 11/1998 | Levin et al. .................. 224/553 |
| 5,845,965 A * | 12/1998 | Heath et al. ............ 297/188.19 |
| 6,152,522 A | 11/2000 | Boulay et al. |
| 6,158,793 A | 12/2000 | Castro |
| 6,367,857 B2 | 4/2002 | Kifer et al. |
| 6,428,072 B1 | 8/2002 | Moore |
| 6,719,343 B2 | 4/2004 | Emerling et al. |
| 6,719,344 B2 | 4/2004 | Ono et al. |
| 6,761,388 B2 * | 7/2004 | Lein et al. ................ 296/24.34 |
| 6,890,012 B2 | 5/2005 | Maierholzner |
| 6,929,304 B1 * | 8/2005 | Dry et al. .................. 296/37.8 |
| 6,942,267 B1 | 9/2005 | Sturt |
| 7,175,217 B1 * | 2/2007 | Lota .......................... 296/24.34 |
| 2002/0089217 A1 * | 7/2002 | Scheerhorn ............ 297/188.19 |
| 2003/0047955 A1 | 3/2003 | Bruhnke et al. |
| 2004/0189797 A1 | 9/2004 | Todd |
| 2005/0230993 A1 * | 10/2005 | Dry ............................ 296/37.8 |
| 2006/0022478 A1 * | 2/2006 | DeLong et al. ............. 296/37.8 |
| 2006/0085940 A1 * | 4/2006 | Chernoff ...................... 15/313 |
| 2006/0108816 A1 * | 5/2006 | Radu et al. ................ 296/24.34 |

(Continued)

FOREIGN PATENT DOCUMENTS

DE 4415732 A1 11/1995

(Continued)

*Primary Examiner*—Jason S Morrow
(74) *Attorney, Agent, or Firm*—Ralph E. Smith

(57) ABSTRACT

A center console has an armrest that is hinged to provide access to a storage bin, and in addition has a compartment for an electronic device such a cellular phone, MP3 player or a handheld GPS navigation unit. The compartment preferably has a pivoted cover that closes to conceal the device from sight. A cradle attached to the cover holds the device when the cover is open so that it is in a convenient position for use by a vehicle occupant. The armrest may be slid forward relative to the center console to position the device close to the radio, in the field of vision of the driver, and permitting connection of the device to the radio or to an external outlet if desired. A finger recess may be provided in the armrest to permit cables to pass from the interior of the compartment to the exterior of the compartment.

10 Claims, 2 Drawing Sheets

U.S. PATENT DOCUMENTS

2007/0046058 A1* 3/2007 Busha et al. ............... 296/37.8
2007/0069544 A1* 3/2007 Sturt et al. ................ 296/37.8
2007/0075558 A1* 4/2007 Kim et al. ................ 296/24.34
2007/0152461 A1* 7/2007 Joler et al. ............... 296/24.34
2007/0194582 A1* 8/2007 Arbaugh et al. .......... 296/24.34

FOREIGN PATENT DOCUMENTS

| | | |
|---|---|---|
| DE | 100 32 658 A1 | 4/2002 |
| EP | 0982192 A2 | 3/2000 |

* cited by examiner

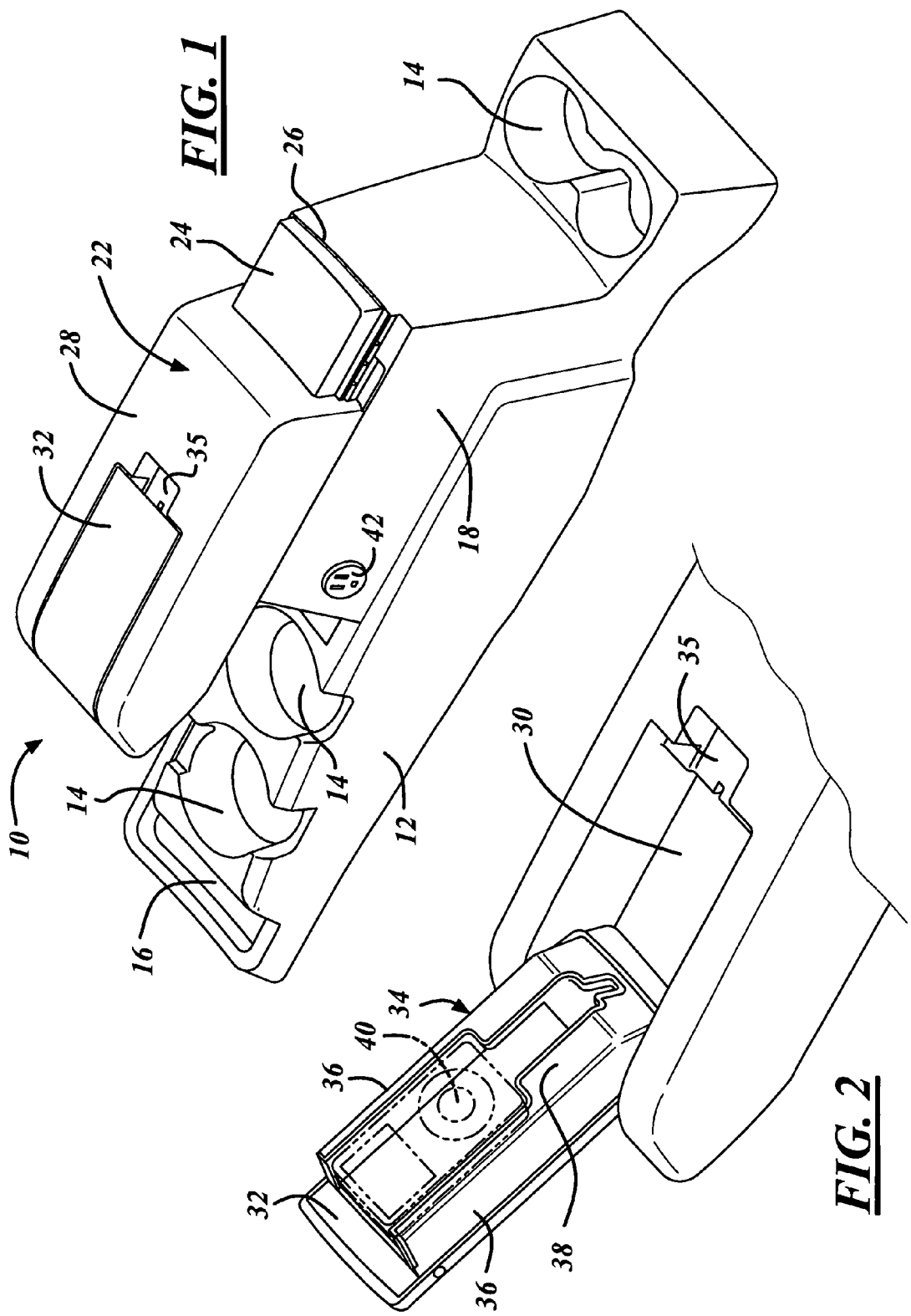

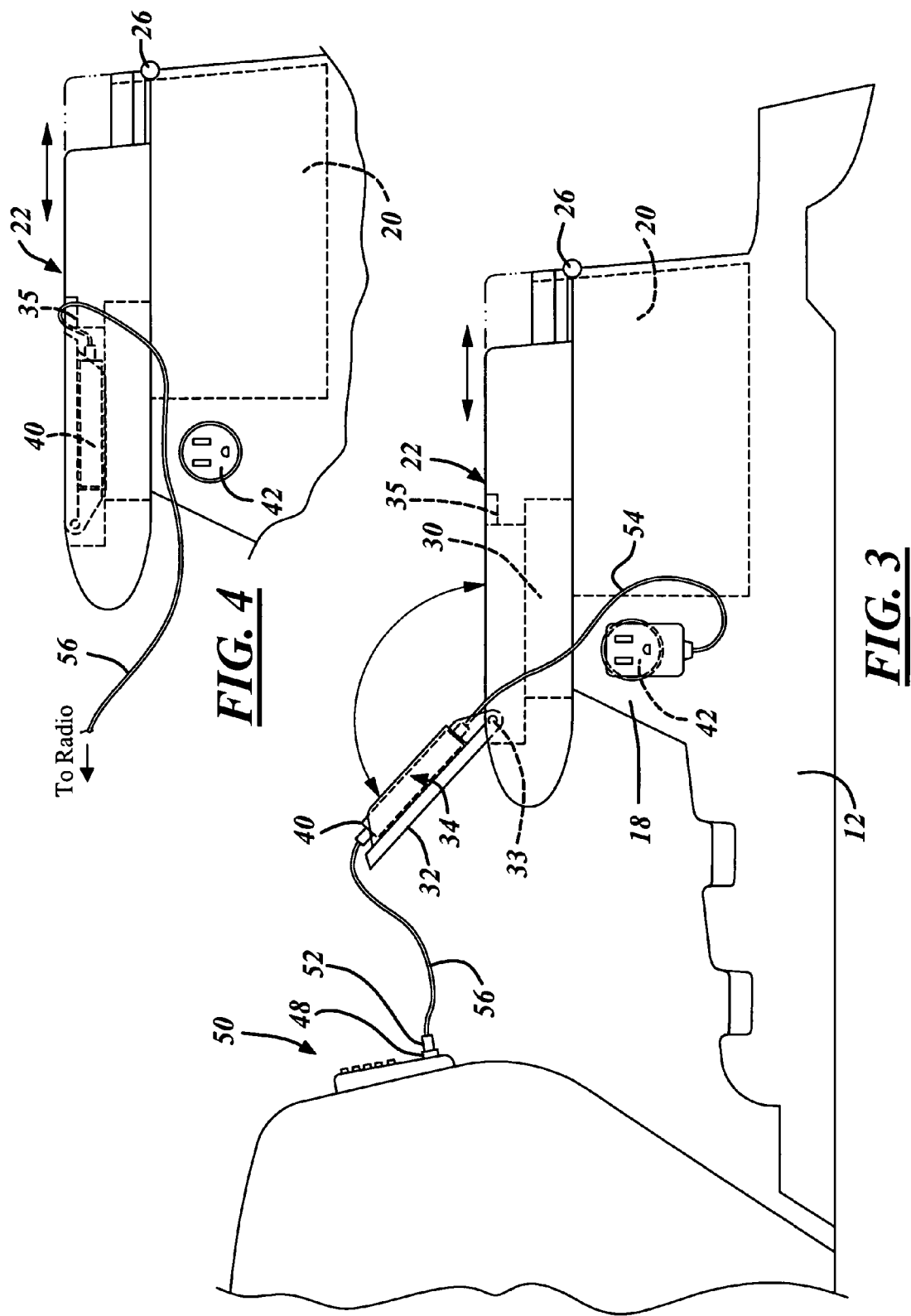

HOLDER FOR AN ELECTRONIC DEVICE

FIELD OF THE INVENTION

The present invention relates to a vehicle interior component and more particularly to a vehicle console or compartment for an electronic device.

BACKGROUND OF THE INVENTION

Center consoles in automotive vehicles are well known in the art. Such consoles may be used as an armrest for the convenience and comfort of the vehicle occupants, and to provide storage for maps, note pads, writing instruments, and other articles. Electronic devices such as cellular phones, MP3 players and handheld GPS navigation units may be stored in the center console to conceal them from sight for security purposes, but when use of the device is desired, the occupant has to fumble through the other contents of the console until device is found, and extract the device for use. The user then has to find a suitable resting place for the device where it is accessible and handy for use, and where it is stable so that the device will not fall between the seats or onto the floor.

SUMMARY OF THE INVENTION

A center console is provided having an armrest that is hinged to provide access to a storage bin, and in addition has a compartment for an electronic device such a cellular phone, MP3 player or a handheld GPS navigation unit. The compartment preferably has a hinged cover that closes to conceal the device from sight. A cradle attached to the cover holds the device and presents the device to a user in a convenient position when the cover is open. The armrest may be slid forward relative to the console to position the device close to the radio, in the field of vision of the driver, and permitting connection of the device to the radio if desired.

BRIEF DESCRIPTION OF THE DRAWINGS

These and other objects, features and advantages of the present invention will be apparent from the following detailed description of preferred embodiments and best mode, appended claims and accompanying drawings in which:

FIG. 1 is an overhead perspective view of a center console with a hidden holder in the armrest for an electronic device with the holder in the closed position according to an exemplary embodiment of the present invention;

FIG. 2 is perspective view of the armrest with the holder in the open position according to an exemplary embodiment of the present invention;

FIG. 3 is a side view of the center console of FIG. 1 showing the holder in the open position according to an exemplary embodiment of the present invention; and FIG. 4 is a side view of the center console of FIG. 1 showing the holder in the closed position according to an exemplary embodiment of the present invention.

DETAILED DESCRIPTION OF PREFERRED EMBODIMENTS

Referring in more detail to the drawings, FIG. 1 shows a center console generally designated by the reference numeral 10. The center console comprises a lower base 12 having one or more recesses 14 to receive a cup or other beverage container. The front portion of the base 12 is formed with a tray 16 to hold miscellaneous items such as coins, chewing gum, and the like. A riser portion 18 is mounted on the base 12 and is hollow to provide a storage bin 20 (shown in phantom on FIGS. 3 and 4) for maps and other items.

The riser portion 18 supports an armrest 22. The armrest 22 comprises a base block 24 that is attached to the riser portion by a hinge 26 that extends along the back end of the armrest. The hinge 26 allows the armrest to pivot to the rear for access to the storage bin 20 in the riser portion 18. An arm cushion 28 is slidably mounted on the base block 24 so that the position of the arm cushion 28 may be adjusted fore and aft as best seen in FIGS. 3 and 4. The front portion of the arm cushion 28 is formed with a compartment 30 best seen in FIG. 2. A cover 32 is provided for the compartment 30 and is shown in the closed position. The cover 32 is attached to the armrest 22 by a pivot connection 33 shown in FIG. 3 so that the cover pivots forward to the open position as shown in FIG. 2. The upper surface of the cover 32 lies flush with the upper surface of the armrest 22. A recess 35 is formed in the surface of the armrest 22 to provide finger access to the rear edge of the cover 32 allowing it to be easily raised from the closed position to the open position. The recess 35 also provides a passageway to the interior of the compartment 30 allowing cables to pass from the compartment to the exterior of the armrest as more fully explained below.

FIG. 2 shows the armrest 22 with the cover 32 in the open position. A device holder or cradle 34 is mounted on the inside of the cover 32. The cradle 34 comprises two side portions 36 which extend along the sides of the cover 32 and a front retainer portion 38 that holds a device 40 in place when the cover is opened and closed. The cradle 34 is dimensioned to receive a portable electronic device 40 such as cellular phone, MP3 player, a handheld GPS navigation unit, or the like.

FIG. 3 is a side view of the center console of FIG. 1. The arm cushion 28 is slideable relative to the base block 24 between the rearmost position shown in phantom and the forward position shown in full. A power outlet 42 is provided on the outside surface of the riser portion 18. A power cord 54 from the electronic device 40 may be plugged the power outlet 42 to power or charge the electronic device.

FIG. 4 is a side view of the center console of FIG. 1 with the cover 32 in the closed position. The finger recesses 35 provides a passageway to the interior of the compartment 30 to allow a signal cable 56 fitted with a suitable connector 52 to couple the device 40 in the cradle such as an MP3 player to an auxiliary audio input jack 48 on the radio 50 when the cover is closed. Although not shown, the finger recess 35 may also be used to provide a passageway for a power cable from the electronic device 40 so that the electronic device may coupled to the power outlet 42 when the cover 32 is in the closed position without binding or crimping the cable.

In use, the storage bin 20 in the center console may be accessed by pivoting the armrest 22 rearward around the rear hinge 26. The arm cushion 28 may be slid forward or back as desired to suit the comfort needs of the user. When the compartment cover 32 is in the closed position, the electronic device 40 in the compartment 30 is hidden from view, providing a certain amount of security for the device. When the cover 32 is closed, the electronic device may be coupled to the power outlet or the radio via cables passed through the finger recess 35.

When the compartment cover 32 is in the open position, the electronic device is readily accessible to the driver or other vehicle occupant. The device may be removed from the holder 34 for use, or left in the holder for hands-free operation. Sliding the armrest 22 forward positions the device close to the radio, ensuring visibility and convenience for the driver.

Having thus described the invention, various modifications and alterations will occur to those skilled in the art, which modifications and alterations are intended to be within the scope of the invention as defined by the appended claims.

What is claimed is:

1. A center console assembly for a vehicle comprising:
   a riser portion defining a storage bin, the riser portion having an open top;
   an armrest mounted on the riser portion and providing access to the storage bin and including an arm cushion slidable fore and aft;
   a compartment in a front portion of the arm cushion of the armrest for receiving an electronic device;
   a cradle connected to the armrest that releasably holds the electronic device; and,
   a cover on the compartment that may be used to hide the electronic device from sight and that is pivotable forward from a closed position to an open position;
   wherein the armrest is slidable forward to position the electronic device to ensure driver visibility of the electronic device when the cover is pivoted to the open position;
   wherein a recess formed in the armrest provides finger access to an edge of the cover to allow the cover to be raised from the closed position to the open position and also provides a passageway from the interior of the compartment to the exterior of the armrest when the cover is in the closed position.

2. The center console assembly of claim 1 wherein the armrest provides access to the storage bin by pivoting to the rear between closed and open armrest positions.

3. The center console assembly of claim 2 wherein the cradle is mounted on the inside of the cover.

4. The center console assembly of claim 3 wherein the compartment and the cradle are enclosed by the cover when the cover is moved to the closed position.

5. The center console assembly of claim 1 wherein the electronic device is a cellular phone, an MP3 player, or a handheld GPS navigation device.

6. The center console assembly of claim 1 further comprising a power outlet mounted on the outside of the riser portion for the electronic device.

7. A center console for a vehicle, the console having a storage bin with an open top and an armrest positioned above the storage bin and including an arm cushion slidable fore and aft, the console comprising:
   a compartment formed in a front portion of the arm cushion of the armrest for receiving an electronic device;
   a cover for the compartment that is pivotable forward from a closed position to an open position; and
   a cradle mounted on the cover for removably receiving the electronic device, whereby the cover conceals the electronic device in the armrest when the cover is closed, and the electronic device is readily available to a vehicle occupant when the cover is open and when the armrest is slidable forward to position the electronic device to ensure driver visibility of the electronic device when the cover is pivoted to the open position;
   wherein a recess formed in the armrest provides finger access to an edge of the cover to allow the cover to be raised from the closed position to the open position and also provides a passageway from the interior of the compartment to the exterior of the armrest when the cover is in the closed position, whereby an electronic device in the compartment may be coupled to a radio in the vehicle when the cover of the compartment is in the closed position by passage of a signal cable from the electronic device through the recess.

8. The center console of claim 7 further comprising:
   a hinge positioned at the rear of the armrest and coupling the armrest to the center console, the hinge permitting the armrest to pivot rearward to an open armrest position; and
   a pivot connection between the cover and the armrest, the pivot connection positioned at the front of the armrest and the front of the cover, whereby the cover pivots forward to the open position.

9. The center console of claim 8 further comprising:
   a sliding connection between the armrest and the center console, the sliding connection allowing the armrest to slide forward toward a radio mounted in the dashboard in the vehicle, whereby an electronic device in the compartment moves into proximity of the radio when the armrest slides forward.

10. The center console of claim 7 further comprising:
    a power outlet mounted on the outside of the center console, whereby the electronic device may be coupled to the power outlet when the cover is closed by passing a power cord for the electronic device through the recess.

* * * * *